though the word "thermoplastic" is used in the description of the invention and the claims, this term is to be understood in its broadest sense, and is intended to include synthetic materials which are flexible or resilient at room temperature. This is in contrast to synthetic thermoplastic materials which are brittle at room temperature, and require softeners or plasticizers for becoming flexible.

United States Patent [19]
Lorenian et al.

[11] 3,996,176
[45] Dec. 7, 1976

[54] METHOD OF MANUFACTURING SHAPED MEMBERS OF SYNTHETIC THERMOPLASTIC MATERIALS FREE OF SOFTENERS

[76] Inventors: Zareh Lorenian; Eugenia Lorenian, both of Friedrichsplatz 16, Mannheim, Germany

[22] Filed: Oct. 14, 1975

[21] Appl. No.: 622,384

Related U.S. Application Data

[63] Continuation of Ser. No. 482,877, June 25, 1974, abandoned, which is a continuation of Ser. No. 339,030, March 7, 1973, abandoned.

[30] Foreign Application Priority Data

Mar. 8, 1972    Germany ........................ 2210992

[52] U.S. Cl. .......................................... 260/28.5 A
[51] Int. Cl.² .......................................... C08L 91/00
[58] Field of Search .............. 260/28.5 A; 106/38.8

[56] References Cited

UNITED STATES PATENTS

| | | | |
|---|---|---|---|
| 3,140,268 | 7/1964 | Halpern et al. | 106/38.8 |
| 3,554,552 | 1/1971 | Nixon et al. | 260/28.5 A X |
| 3,565,815 | 2/1971 | Christy | 260/28.5 A X |

*Primary Examiner*—Lewis T. Jacobs
*Attorney, Agent, or Firm*—Herbert L. Lerner

[57] ABSTRACT

Method of manufacturing shaped articles of synthetic thermoplastic materials free of any softener includes intimately mixing a synthetic thermoplastic material free of softener and having the property of being flexible at room temperature after it has been processed into a shaped article, with wax in dry state at an elevated temperature, and subsequently forming the mixture into a shaped article in a shaping apparatus.

3 Claims, No Drawings

METHOD OF MANUFACTURING SHAPED MEMBERS OF SYNTHETIC THERMOPLASTIC MATERIALS FREE OF SOFTENERS

This is a continuation, of application Ser. No. 482,877, filed June 25, 1974, which is a continuation of Ser. No. 339,030, filed Mar. 7, 1973, both now abandoned.

The invention relates to method of manufacturing shaped members of synthetic thermoplastic materials free of softeners.

It is known that various thermoplastic synthetic materials which contain no softeners can be used to make shaped articles that are flexible at room temperature and are difficult to cut. Such materials include butadiene rubber, the modified polystyrene which is known as "impact-resistant polystyrene," polypropylene, polyethylene, and polyamides. Also included is hard polyvinyl chloride and other similar thermoplastic materials after they have been formed into shaped articles, for example, in the manufacture of thin profiles round rods or plates in an extrusion process, or in the manufacture of thin objects by injection-molding or blowing.

In contrast thereto, it is an object of the present invention to produce shaped members that are rigid and easily cuttable at room temperature from thermoplastic synthetic materials which contain no softeners and which are themselves flexible at room temperature.

With the foregoing and other objects in view, there is provided in accordance with the invention, a method of manufacturing shaped articles of synthetic thermoplastic materials free of any softener which comprises mixing and/or kneading a thermoplastic synthetic material, that contains no softener and that is itself flexible at room temperature, with a synthetic and/or natural hard wax at elevated temperature in dry state, and subsequently processing the mixture in an extrusion apparatus, injection-molding apparatus, or blowing apparatus, to form a shaped member.

In accordance with a preferred mode of the method of the invention, at least one additional organic or inorganic material in dry state, selected from the group consisting of wood powder, straw powder, cellulose powder, kaolin, talcum, asbestos, glass powder, rock powder, a coloring agent, pigment or propellant, is admixed in the dry state and at elevated temperature before the processing into shaped members is performed. In this way a substantial reduction in the cost of the bulk material is achieved.

The German Published Non-Prosecuted Patent Application DOS 1,569,399 is believed to be the closest item of prior art, particularly the discussion of the state of the art in the introduction to the description therein. However, this reference merely refers to the mixing of wax and polymers at elevated temperatures and high shearing speeds. It is neither concerned with a method for manufacturing shaped articles nor with solving the technical problem of producing shaped articles from thermoplastic synthetic materials which contain no softeners, and which, on the contrary are rigid and easily cuttable. The German Published Non-Prosecuted Patent Application DOS 1,569,399 and the prior art discussed therein are concerned with quite another technical problem, that of mixing polymers and wax to obtain a material suitable for coating paper and cardboard.

It is also known to use hardened sperm oil or pressed and hardened sperm oil residues as lubricant for synthetic thermoplastic materials (German Published Non-Prosecuted Patent Application DOS 1,544,981). Furthermore, it is known to use a mixture of paraffin and wood powder as a hydrophobic agent for rendering swell-resistant chip board manufactured from wood chips or from liquified vegetable fibers bonded with a urea-formaldehyde resin (German Published Non-Prosecuted Patent Application DOS 1,719,303).

The aforementioned German Patent Applications are not even remotely concerned with manufacturing shaped articles in the sense of the present invention.

Further features of the present invention will now be further explained, with reference to the following examples.

EXAMPLE 1

Two to eight kilograms of impact-resistant polystyrene are mixed and/or kneaded with at least two to four kilograms of synthetic and/or natural hard wax, in hot condition; and then the resulting mixture is processed at 130° to 220° C in extrusion, injection-molding, or blowing apparatuses, so as to form shaped members.

EXAMPLE 2.

Two to four kilograms of wood powder and/or straw powder and/or cellulose powder and/or kaolin and/or talcum and/or asbestos and/or glass powder and/or rock powder and/or coloring agent and/or pigments are mixed and/or kneaded with two to four kilograms of a synthetic and/or natural hard wax, in the hot state; and then two to eight kilograms of impact-resistant polystyrene are added; and all these constituents are mixed and/or kneaded in hot state, and thereupon are processed into shaped members, in an extrusion apparatus and/or injection-molding apparatus and/or blowing apparatus.

EXAMPLE 3.

Two to eight kilograms of a thermoplastic synthetic material, which contains no softeners, are mixed with two to four kilograms of synthetic and/or natural hard wax; and then two to four kilograms of at least one of the organic or inorganic additive materials named in Example 2 is admixed therewith; then the whole is kneaded, and subsequently the resulting mixture is processed into shaped members in an extrusion apparatus and/or injection-molding apparatus and/or blowing apparatus at a temperature of about 120° to 220° C.

EXAMPLE 4.

Two to four kilograms of at least one of the organic or inorganic additive materials named in Example 2 are mixed and/or kneaded with two to four kilograms of synthetic and/or natural hard wax and with two to eight kilograms of impact-resistant polystyrene or of another thermoplastic synthetic material which contains no softeners; in one process, in a Banbury mixer or a fluid mixer; and the resulting mixture then is processed into shaped members in an extrusion apparatus and/or injection molding apparatus and/or blowing apparatus.

From the above-mentioned Examples 1 to 4, it can be seen that in each case it is preferable to keep the proportion of thermoplastic synthetic material higher than the proportion of wax and/or the proportion of organic or inorganic additive materials.

As additive material, in certain cases, a propellant is recommendable, particularly, if one wishes to manufacture shaped members which have a porous structure and, at the same time, maintain a given rigidity and/or easy cutting capability. A reduction in the specific weight of the shaped members is achieved thereby, which can be very advantageous in certain modes of application.

We claim:

1. Method of manufacturing shaped articles such as round rods or plates of polystyrene which comprises intimately mixing in the absence of any plasticizer, a synthetic thermoplastic material consisting essentially of impact-resistant polystyrene, with natural hard wax in the proportion of two to eight parts by weight of said polystyrene to at least two to four parts by weight of said wax, said proportion in each case having a higher proportion of said polystyrene than the proportion of said wax in dry state with said wax constituting at least 25% by weight of said polystyrene, and subsequently shaping the mixture at a temperature of 130° to 220° C by extrusion, injection molding or blow molding into said shaped article.

2. Method according to claim 1 wherein at least one additional substance selected from the group consisting of cellulose powder, kaolin, talcum, asbestos, glass powder, rock powder, coloring agent, pigments and propellants is admixed in dry state and at elevated temperature to the mixture and wax to form a final mixture, and forming the final mixture into a shaped member.

3. Method of manufacturing shaped articles such as rods or plates in a shaping apparatus comprising in combination:
   a. intimately mixing in the absence of any plasticizer, synthetic thermoplastic material consisting essentially of impact resistant polystyrene in dry and hot state;
   b. with natural hard wax in the proportion of two to eight parts by weight of said polystyrene to at least two to four parts by weight of said wax, said proportion in each case having a higher proportion of said polystyrene than the proportion of said wax with said wax consisting of at least 25% by weight of said polystyrene;
   c. mixing said materials with at least one additional substance selected from the group consisting of cellulose powder, kaolin, talcum, asbestos, glass powder and rock powder; and
   d. subsequently shaping the resultant mixture at a temperature of 130° to 200° C by extrusion, injection molding or blow molding into said shaped article.

* * * * *